United States Patent [19]

Williams

[11] 4,063,762
[45] Dec. 20, 1977

[54] CANOPY FOR PICKUP TRUCKS

[76] Inventor: Allan R. Williams, 6750 - 15th Northwest, Seattle, Wash. 98117

[21] Appl. No.: 710,587

[22] Filed: Aug. 2, 1976

[51] Int. Cl.² ............................................. B60P 3/34
[52] U.S. Cl. ............................... 290/23 R; 296/137 B
[58] Field of Search ............... 296/104, 103, 105, 100, 296/137 B, 137 R, 27, 108, 23 R, 102

[56] References Cited

U.S. PATENT DOCUMENTS

| 304,015 | 8/1884 | Mahan | 296/102 |
|---|---|---|---|
| 1,358,978 | 11/1920 | Norton | 296/104 |
| 2,774,623 | 12/1956 | Owen | 296/104 |
| 3,024,063 | 3/1962 | Robinson | 296/100 |

Primary Examiner—Robert R. Song
Attorney, Agent, or Firm—Seed, Berry, Vernon & Baynham

[57] ABSTRACT

A canopy for covering the bed of a pickup truck having a rigid frame covered by a flexible shell. The frame includes a plurality of elongated, spaced apart side supports extending between the sides of the truck adjacent the bed and a roof support. The roof support includes a plurality of transverse, 1elongated roof members spaced apart by the same distance as the side supports, and a substantially rigid sheet of plywood or similar material fastened across the top of the roof members. A flexible shell having a top and sides is then placed over the side and roof supports, and the lower edges of the shell are secured to the truck sidewalls thereby snugly positioning the shell around the side and roof frames. The side supports are pivotally secured to the roof members so that after the shell has been removed from the frame and the frame has been removed from the truck the sides may be folded inwardly and the shell may be folded compactly for storage of the canopy support.

8 Claims, 6 Drawing Figures

FIG. 3
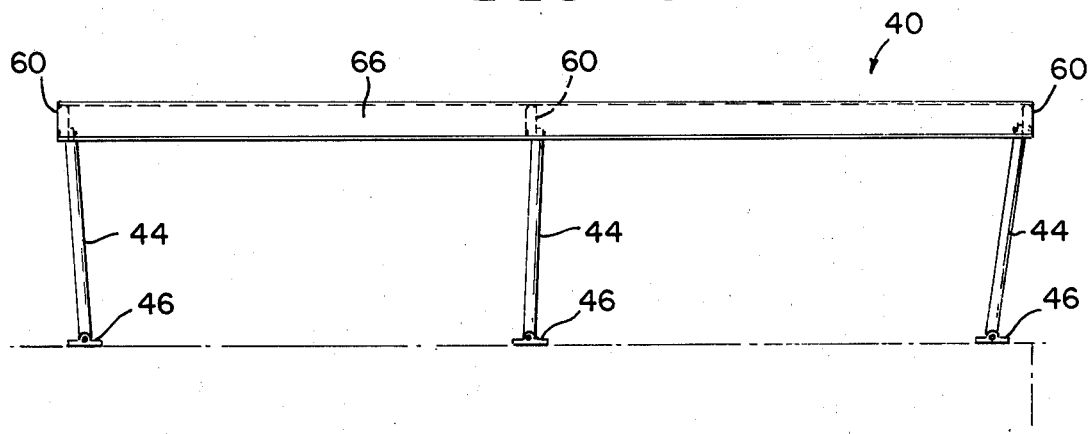
FIG. 4
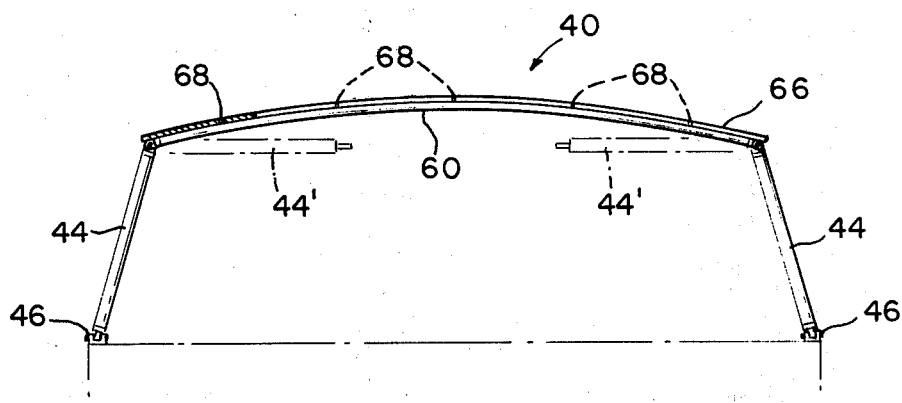
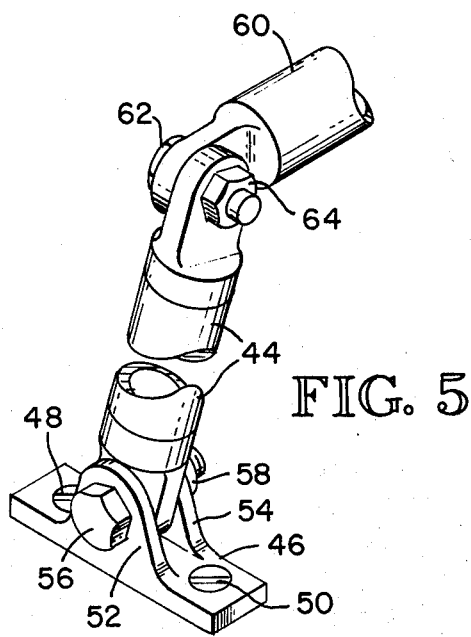
FIG. 5
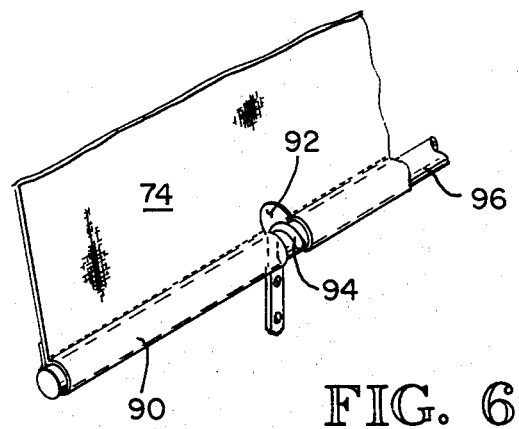
FIG. 6

CANOPY FOR PICKUP TRUCKS

BACKGROUND OF THE INVENTION

1. Field of the Invention

This invention relates to canopies for pickup trucks and, more particularly, to a canopy having a compactly stored, rigid frame covered by a flexible shell.

1. Description of the Prior Art

Canopies for covering the beds of pickup trucks have become increasingly popular in recent years. These canopies include a top, a pair of sides which usually contain windows, a front and a back. The entire canopy is generally a unitary structure fabricated of a sheet metal such as aluminum. These canopies are fairly expensive and, since they form a unitary structure, they cannot be compactly stored.

In an attempt to avoid the above-mentioned problems, canopies have been devised which include a shell of flexible material snugly positioned over a rigid frame. The frames are generally formed by joining elongated, generally tubular, members together at appropriate places. A serious disadvantage of these conventional canopies is that the roof and sometimes the sides sag presenting the appearance of a tent covering the bed of the truck. Furthermore, when the truck is traveling at high rates of speed, the flexible material flaps causing rapid wear of the flexible material and produces undesirable noise.

SUMMARY OF THE INVENTION

It is an object of the invention to provide a canopy for covering the bed of a pickup truck which may be removed from the truck and compactly stored.

It is another object of the invention to provide a canopy utilizing a flexible shell which will not flap when the truck is traveling at a high rate of speed.

It is still another object of the invention to provide a canopy utilizing a flexible shell positioned over a frame having a rigid roof thereby preventing the roof of the shell from sagging.

These and other objects of the invention are provided by a canopy having a planar, substantially rigid roof of a shape corresponding to the shape of the bed, and a pair of sidewalls extending between the longitudinal edges of the roof and the truck sidewalls. The side supports are pivotally secured to the roof so that when the canopy is removed from the truck it may be compactly stored by folding the side supports inwardly against the underside of the roof. The canopy may be formed by a frame having a rigid roof support and a plurality of elongated side supports extending between the truck sides and the longitudinal edges of the roof support. A flexible shell may then be placed over the frame and the lower edges of the shell secured to the truck thereby snugly positioning the shell around the frame. The roof support may be formed by a plurality of spaced apart, transverse elongated roof support members having a rigid sheet fastened to the tops of the roof support members. The rigid roof support prevents the roof of the flexible shell from sagging. The flexible shell is preferably fabricated of a material, such as vinyl sheet material, having some stiffness so that when it is snugly positioned over the roof and side supports it does not flap when the truck is moving at a high rate of speed.

BRIEF DESCRIPTION OF THE FIGURES OF THE DRAWING

FIg. 3 is a side elevational view of the canopy without the flexible shell.

FIG. 4 is a rear elevational view of the canopy without the flexible shell.

FIG. 5 is an isometric view showing the manner in which the side supports are removably secured to mounting pads on the truck and pivotally secured to the transverse roof support members.

FIG. 6 is an isometric view illustrating the manner in which the lower edges of the flexible shell are secured to the truck sidewalls.

DETAILED DESCRIPTION OF THE INVENTION

Figure 1:
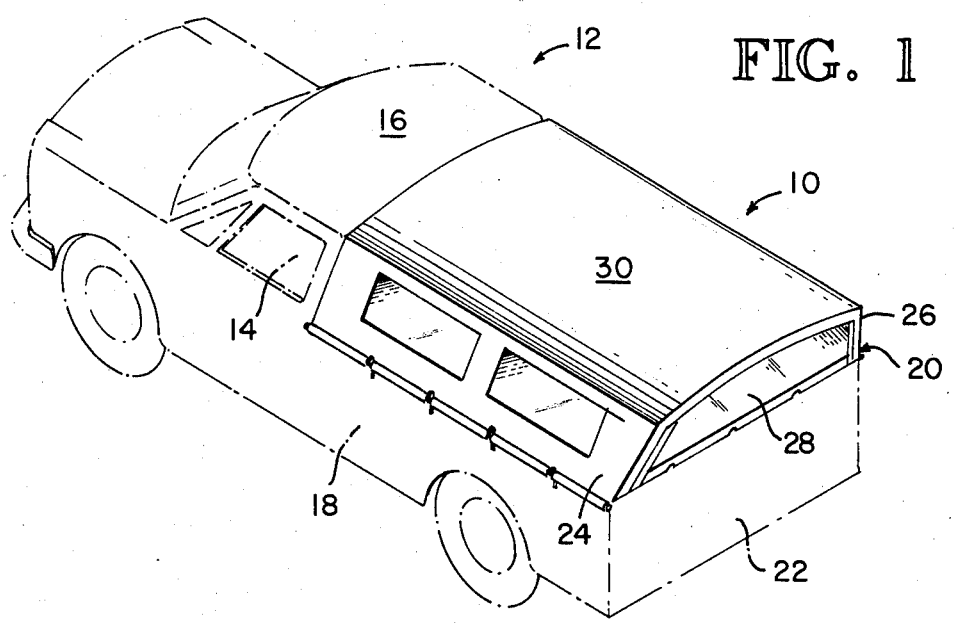
FIG. 1 is an isometric view illustrating the canopy installed on a pickup truck.

The canopy 10, as illustrated in FIG. 1, is installed on a conventional pickup truck 12. The truck 12 includes a cab 14 covered by a cab roof 16 which is generally curved when viewed in transverse cross section. A flat bed (not shown) is behind the cab 16 and is surrounded on two sides by sidewalls 18, 20 and at the rear by a tailgate 22.

The canopy 10 includes a pair of sloped sidewalls 24, 26, a rear panel 28, and a substantially rigid roof 30 having a transverse curvature conforming to the transverse curvature of the cab roof 16. The lower edges of the sidewalls 24, 26 are secured to the truck sidewalls 18, 20, respectively, as explained hereinafter.

Figure 2:
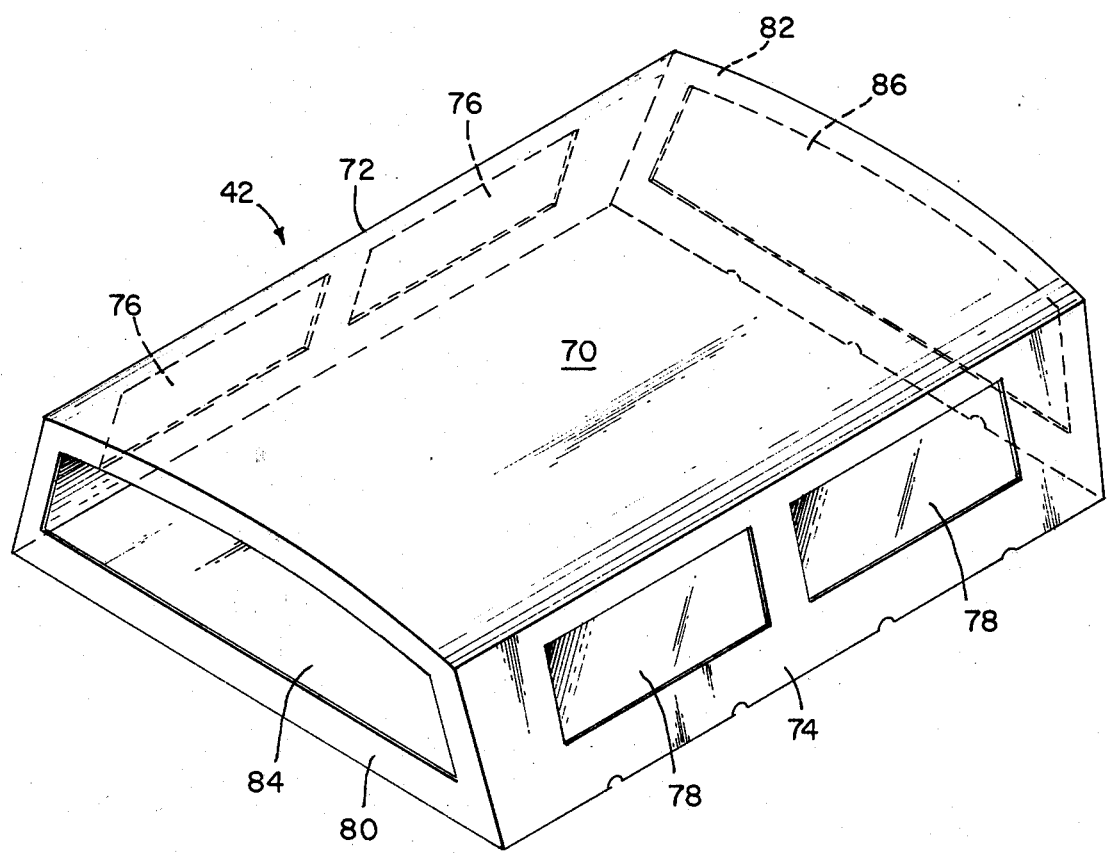
FIG. 2 is an isometric view of the flexible shell for the canopy.

The structural details of the canopy are illustrated in greater detail in FIGS. 2-4. The canopy includes a rigid frame 40 (FIGS. 3, 4) over which is placed a flexible shell 42 (FIG. 2). The frame 40 includes a plurality of spaced apart, elongated side supports 44. The lower ends of the side supports 44 are releasible secured to mounting pads 46 which, as best illustrated in FIG. 5, are fastened to the top edge of the truck sidewalls 18, 20 by screws 48, 50. The pads 46 include a pair of spaced apart ears 52, 54 between which the lower end of the support 44 is placed. The ears 52, 54 and the lower end of the side supports 44 contain a bore through which a bolt 56 is placed and secured with a nut 58. The supports 44 may be removed from the truck 12 simply by unscrewing the nut 58 from the bolt 56, removing the bolt 56 and lifting the supports 44 from the pads 46.

The upper ends of each side support 44 are pivotally secured to a transverse elongated roof support member 60 having a curvature conforming to the transverse curvature of the cab roof 16. As best illustrated in FIG. 5, the upper end of the side supports 44 and the ends of the roof support members 60 terminate in a flattened portion having a bore through which a bolt 62 is inserted and retained by a nut 64. A substantially rigid sheet 66 (FIG. 4) of a material such as plywood having a shape corresponding to the shape of the bed is placed on the roof support members 60 and fastened in placed by a plurality of screws 68 which are preferably countersunk in the sheet 66.

After the frame 40 has been installed on the truck 12, a flexible shell 42 (FIG. 2) is placed over the frame 40. The shell 42 may be fabricated of a variety of suitable materials such as vinyl sheet material. The shell 42 includes a top 70, sides 72, 74 containing sewn in windows 76, 78, respectively. Similarly, the front and rear ends 80, 82, respectively, each contain sewn in windows 84, 86, respectively. The windows 76, 78, 84, 86 may be of any flexible transparent material such as clear plastic. The shell 42 is placed over the frame 40 and the lower edges of the shell sides 72, 74 are secured to the truck as best illustrated in FIG. 6. The lower edges of the shell sides 72, 74 contain an elongated loop 90 having a plurality of notches 92 at points corresponding to the positions of a plurality of downwardly pointed hooks 94 fastened to the top portion of the outer sidewalls 18, 20 adjacent the bed. A bar 96 is then inserted through the loop 90 beneath the hooks 94 so that the hooks prevent the bar 96 and hence the sides 72, 74 from moving upwardly with respect to the sidewalls 18, 20.

The canopy is placed on the truck by first securing the side supports 44 to the mounting pads 46 by bolts 56 and nuts 58. The connection between the side supports 44 and the roof support members 60 are then tightened by torqing the nut 64 on the bolts 62. Finally, the shell 42 is placed over the frame 40 and secured in placed by inserting the bars 96 through the loops 90.

When the canopy 10 is to be removed from the truck 12 and stored, the shell 42 and frame 40 are removed from the truck 12 in the reverse sequence with which they were installed. The side supports 44 are then pivoted inwardly against the underside of the roof support members 60 as illustrated in phantom at 44' in FIG. 4. Consequently the vertical height of the frame 40 in storage is reduced to a considerable degree thus allowing the canopy to be compactly stored. Meanwhile, the shell 40 can be folded to also provide for compact storage.

The embodiments of the invention in which a particular property or privilege is claimed are defined as follows:

1. A canopy for covering the bed of a pickup truck, comprising:
    a rigid, planar roof support having a shape corresponding to the shape of said bed;
    a plurality of rigid, elongated side supports having one end of said of said side supports removably secured to said truck along the sides of said bed, and the other end thereof pivotally secured to said roof support at opposite sides thereof such that said side supports may be folded inwardly against the lower surfaces of said roof support for compact storage; and
    an integral, flexible shell having a top corresponding to the shape of said roof support, and a pair of sidewalls having a height approximately equal to the height of said side supports and a length approximately equal to the length of said roof support, said canopy further including means for securing the lower edges of said shell to said truck such that said shell is snugly positioned over said roof and side supports.

2. The canopy of claim 1, wherein said truck includes bed sidewalls on opposite sides of said truck, and a plurality of spaced apart, downwardly facing hooks positioned on the outer face of said sides adjacent the top edge thereof, and wherein said means for securing the lower edges of said sheet to said truck comprise:
    an elongated loop extending along the lower edges of said shell sidewalls, said loop having a cutout adjacent each hook; and
    a rod inserted in said loop beneath said hooks thereby preventing upward movement of said shell.

3. The canopy of claim 1, wherein said roof support comprises:
    a plurality of transverse, elongated roof members each having one end pivotally connected to one of the side supports on one side of said truck and the other end pivotally connected to one of the side supports on the opposite side of said truck;
    a rigid, generally planar sheet positioned on said roof members, said sheet having a shape corresponding to the shape of said bed; and
    means for securing said sheet to said roof members such that said sheet conforms to the contour of said roof members.

4. The canopy of claim 3, wherein said truck has a cab covered by a cab roof having a shape which is curved in transverse section and wherein said roof members are curved to match the curved shape of said cab roof thereby providing a smooth transition between the roof line of said cab and the roof line of said canopy.

5. A canopy for covering the bed of a pickup truck having sidewalls on opposite sides of said bed and a plurality of spaced apart, downwardly facing hooks positioned on the outer face of said sides adjacent to the top edge thereof, said canopy comprising:
    a plurality of rigid, elongated side supports extending upwardly at opposite sides of said bed, the lower ends of said side supports being removably secured to said truck;
    a plurality of transverse, elongated roof members each having one end pivotally connected to one of said side supports on one side of said truck and the other end pivotally connected to one of said side supports on the opposite side of said truck;
    a rigid, generally planar sheet positioned on said roof members, said sheet having a shape corresponding to the shape of said bed;
    an integral, flexible shell having a top corresponding to the shape of said roof support and a pair of sidewalls having a height approximately equal to the height of said side supports and a length approximately equal to the length of said roof support, said canopy further including means for securing the lower edges of said shell to said truck such that said shell is snugly positioned on said roof and side supports;
    an elongated loop extending along the lower edges of said shell sidewalls, said loop having a cutout adjacent each hook; and
    a rod inserted in said loop beneath said hooks thereby preventing upward movement of said shell.

6. In a truck having a bed, a pair of generally vertical sidewalls positioned on opposite sides of said bed, and a cab located in front of said bed and covered by a cab roof, a canopy comprising:
    a plurality of spaced apart mounting pads secured to the upper edges of said sidewalls;
    a roof support including a plurality of elongated roof support members having a length approximately equal to the width of said bed, a planar, substantially rigid sheet having a shape corresponding to the shape of said bed, and means for securing said sheet to said roof support members;
    a plurality of elongated side support members each of which are removably secured to one of said mounting pads at one end and pivotally secured to its corresponding roof support member at its opposite end such that said side supports may be unfastened from said mounting pads and folded inwardly against said roof support members for compact storage;

an integral, flexible shell including a top having a shape corresponding to the shape of said roof support and a pair of sidewalls having a height approximately equal to the height of said side supports and a length approximately equal to the length of said roof support; and means for securing the lower edges of said shell to said truck such that said shell is snugly positioned over said roof and side supports.

7. The canopy of claim 6, wherein said truck has a cab covered by a cab roof having a shape which is curved in transverse section, and wherein said roof support members are curved to match the curved shape of said cab roof thereby providing a smooth transition between the roof line of said cab and the roof line of said canopy.

8. The canopy of claim 6, wherein said truck includes a plurality of downwardly facing hooks positioned on the outer face of said sides adjacent the top edge thereof, and wherein said means for securing the lower edges of said shell to said truck comprise:

an elongated loop extending along the lower edges of said shell sidewalls, said loop having a cutout adjacent each hook; and a rod inserted in said loop beneath said hooks thereby preventing upward movement of said shell.

* * * * *